(12) United States Patent
Zhu et al.

(10) Patent No.: US 11,099,367 B2
(45) Date of Patent: Aug. 24, 2021

(54) FREEFORM SURFACE OFF-AXIAL THREE-MIRROR IMAGING SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Rui-rui Tang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 277 days.

(21) Appl. No.: 16/502,144

(22) Filed: Jul. 3, 2019

(65) Prior Publication Data

US 2020/0241267 A1    Jul. 30, 2020

(30) Foreign Application Priority Data

Jan. 25, 2019   (CN) .......................... 201910075355.X

(51) Int. Cl.
*G02B 17/06*     (2006.01)
*G02B 27/00*     (2006.01)
*G02B 5/10*      (2006.01)

(52) U.S. Cl.
CPC .......... *G02B 17/0642* (2013.01); *G02B 5/10* (2013.01); *G02B 17/0636* (2013.01); *G02B 27/0025* (2013.01)

(58) Field of Classification Search
CPC .. G02B 17/0642; G02B 5/10; G02B 27/0025; G02B 17/0636; G02B 17/0626
See application file for complete search history.

(56) References Cited

U.S. PATENT DOCUMENTS

| 9,250,438 | B2 | 2/2016 | Yang et al. | |
|---|---|---|---|---|
| 10,386,619 | B2 | 8/2019 | Zhu et al. | |
| 2015/0253552 | A1* | 9/2015 | Zhu | G02B 17/0626 250/216 |
| 2018/0164573 | A1* | 6/2018 | Tetaz | G02B 27/0025 |

FOREIGN PATENT DOCUMENTS

| TW | 201523019 | 6/2015 |
|---|---|---|
| TW | 201837526 | 10/2018 |

\* cited by examiner

*Primary Examiner* — Robert E. Tallman
(74) *Attorney, Agent, or Firm* — ScienBiziP, P.C.

(57) ABSTRACT

A freeform surface off-axial three-mirror imaging system comprising a primary mirror, a secondary mirror, a tertiary mirror, and a detector. The secondary mirror comprises a first freeform surface and a second freeform surface. Each reflective surface of the primary mirror, the first freeform surface, the second freeform surface and the tertiary mirror is an xy polynomial freeform surface. The freeform surface off-axial three-mirror imaging system comprises a first effective focal length and a second effective focal length different from the first effective focal length.

20 Claims, 5 Drawing Sheets

FREEFORM SURFACE OFF-AXIAL THREE-MIRROR IMAGING SYSTEM

CROSS-REFERENCE TO RELATED APPLICATIONS

The application is also related to copending applications entitled, "METHOD FOR DESIGNING FREEFORM SURFACE OFF-AXIAL THREE-MIRROR IMAGING SYSTEM", filed Jul. 3, 2019 (Ser. No. 16/502,148); "FREEFORM SURFACE OFF-AXIAL THREE-MIRROR IMAGING SYSTEM", filed Jul. 3, 2019 (Ser. No. 16/502,138); "FREEFORM SURFACE OFF-AXIAL THREE-MIRROR IMAGING SYSTEM", filed Jul. 3, 2019 (Ser. No. 16/502,147).

FIELD

The subject matter herein generally relates to freeform surface off-axial three-mirror imaging systems.

BACKGROUND

Compared with conventional rotationally symmetric surfaces, freeform surfaces have asymmetric surfaces and more degrees of design freedom, which can reduce the aberrations and simplify the structure of the system. In recent years, freeform surfaces are often used in off-axial three-mirror imaging system.

The conventional freeform surface off-axial three-mirror imaging systems is working under an effective focal length (EFL), light from different fields of view converge at different detectors with different locations. And, the detector at the same position can only observe objects in one EFL.

BRIEF DESCRIPTION OF THE DRAWINGS

Implementations of the present technology will now be described, by way of example only, with reference to the attached figures, wherein.

DETAILED DESCRIPTION

Figure 1:
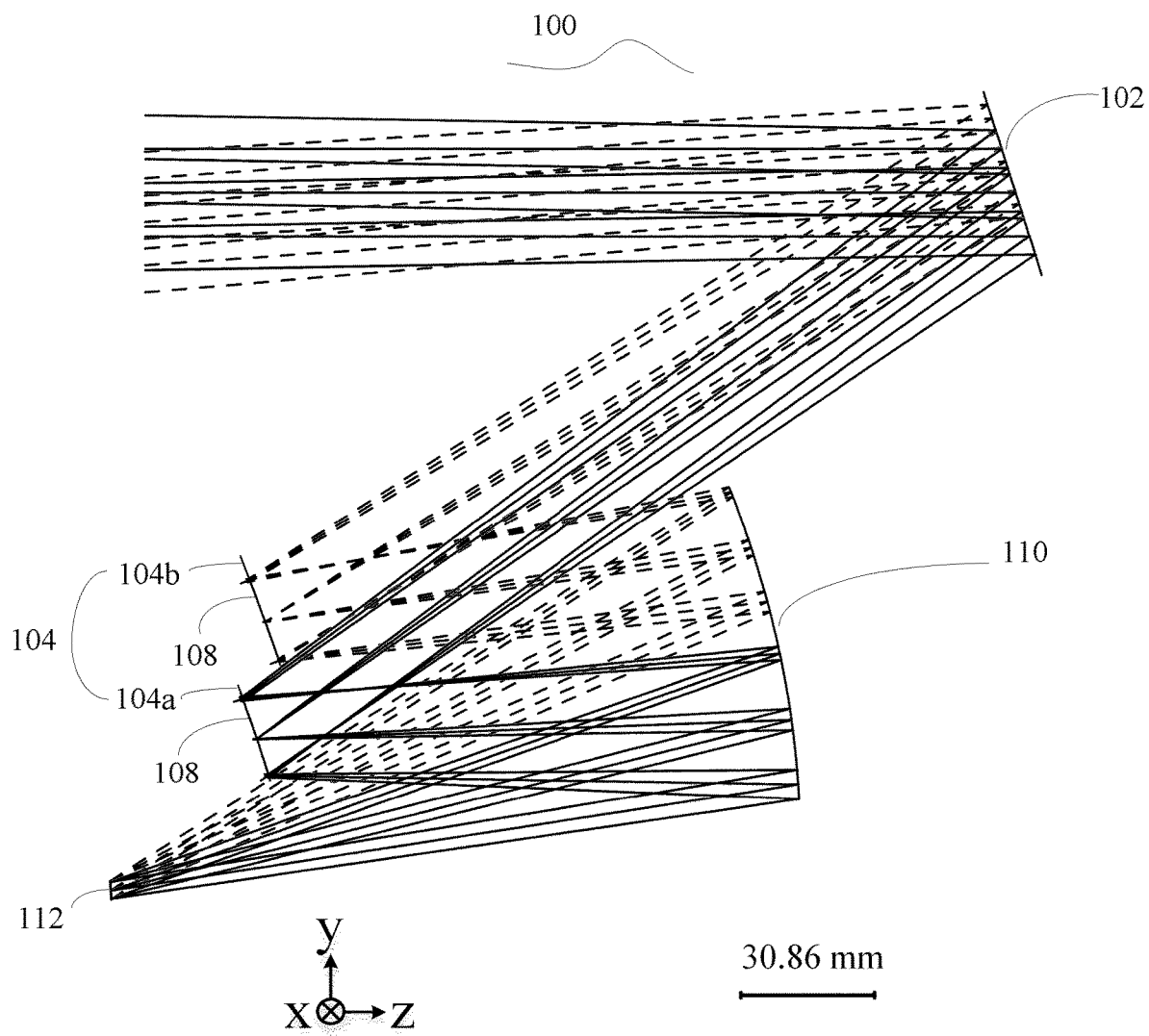
FIG. 1 is a light path schematic view of an embodiment of a freeform surface off-axis three-mirror imaging system.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be that while essentially conforming to the particular dimension, shape, or other feature that is described, the component is not or need not be exactly conforming to the description. The term "comprising," when utilized, means "including, but not necessarily limited to"; it specifically indicates open-ended inclusion or membership in the so-described combination, group, series, and the like.

Referring to FIG. 1, a freeform surface off-axial three-mirror imaging system 100 according to one embodiment is provided. The freeform surface off-axial three-mirror imaging system 100 comprises a primary mirror 102, a secondary mirror 104, an aperture 108, a tertiary mirror 110 and a detector 112. The secondary mirror 104 is an integrated mirror and comprises a first freeform surface 104a and a second freeform surface 104b integrated on a substrate. The aperture 108 is movable and capable of moving from the first freeform surface 104a to the second freeform surface 104b. If the aperture 108 is located on the first freeform surface 104a, the freeform surface off-axial three-mirror imaging system 100 defines a first field of view and a first effective focal length (EFL). If the aperture 108 is located on the second freeform surface 104b, the freeform surface off-axial three-mirror imaging system 100 defines a second field of view and a second EFL. A surface shape of each of the primary mirror 102, the secondary mirror 104, and the tertiary mirror 110 is a freeform surface. The feature rays exiting from the light source would be successively reflected by the primary mirror 102, the secondary mirror 104 and the tertiary mirror 110 to form an image on an detector 112.

A first three-dimensional rectangular coordinates system (X,Y,Z) is defined by a location of the primary mirror 102; a second three-dimensional rectangular coordinates system (X',Y',Z') is defined by a location of the first freeform surface 104a; a third three-dimensional rectangular coordinates system (X'',Y'',Z'') is defined by a location of the second freeform surface 104b; and a fourth three-dimensional rectangular coordinates system (X''',Y''',Z''') is defined by a location of the tertiary mirror 110.

A vertex of the primary mirror 102 is an origin of the first three-dimensional rectangular coordinates system (X,Y,Z). A horizontal line passing through the vertex of the primary mirror 102 is defined as an Z-axis; in the Z-axis, to the left is negative, and to the right is positive. A Y-axis is substantially perpendicular to the Z-axis and in a plane shown in FIG. 1; in the Y-axis, to the upward is positive, and to the downward is negative. An X-axis is substantially perpendicular to a YZ plane; in the X-axis, to the inside is positive, and to the outside is negative.

A reflective surface of the primary mirror 102 in the first three-dimensional rectangular coordinates system (X,Y,Z) is an xy polynomial freeform surface; and an xy polynomial equation can be expressed as follows:

$$z(x, y) = \frac{c(x^2 + y^2)}{1 + \sqrt{1 - (1+k)c^2(x^2 + y^2)}} + \sum_{i=1}^{N} A_i x^m y^n.$$

In the xy polynomial equation, z represents surface sag, c represents surface curvature, k represents conic constant, while $A_i$ represents the ith term coefficient. Since the freeform surface off-axial three-mirror imaging system 100 is symmetrical about a YOZ plane, so even order terms of x can be only remained. At the same time, higher order terms will increase the fabrication difficulty of the off-axial three-mirror optical system with freeform surfaces 100. In one embodiment, the reflective surface of the primary mirror 102 is a fourth-order polynomial freeform surface of xy without odd items of x; and an equation of the fourth-order polynomial freeform surface of xy can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3.$$

In one embodiment, the values of c, k, and $A_i$ in the equation of the eighth-order polynomial freeform surface of xy of the reflective surface of the primary mirror 102 are listed in TABLE 1. However, the values of c, k, and $A_i$ in the eighth order xy polynomial equation are not limited to TABLE 1.

TABLE 1

| | |
|---|---|
| c | −5.8323994031E−04 |
| Conic Constant (k) | −9.9850764719E−01 |
| $A_2$ | 1.2842483202E+00 |
| $A_3$ | −2.2637598437E−04 |
| $A_5$ | −1.2187168002E−03 |
| $A_7$ | 1.3798242519E−05 |
| $A_9$ | 5.0401995782E−06 |
| $A_{10}$ | −6.8791876162E−09 |
| $A_{12}$ | −7.9586143947E−08 |
| $A_{14}$ | 1.3200240494E−07 |
| $A_{16}$ | 6.9303940947E−10 |
| $A_{18}$ | 3.1467633702E−09 |

A vertex of the first freeform surface 104a is an origin of the second three-dimensional rectangular coordinates system (X',Y',Z'). The second three-dimensional rectangular coordinates system (X',Y',Z') is obtained by moving the first three-dimensional rectangular coordinates system (X,Y,Z) along an Z-axis negative direction and a Y-axis positive direction. In one embodiment, The second three-dimensional rectangular coordinates system (X',Y',Z') is obtained by moving the first three-dimensional rectangular coordinates system (X,Y,Z) for about 154.876 mm along the Y-axis positive direction, and then moving for about 134.412 mm along the Z-axis negative direction, and then rotating along the counterclockwise direction for about 69.835° with the X axis as the rotation axis. A distance between the origin of the first three-dimensional rectangular coordinates system (X,Y,Z) and the origin of the second three-dimensional rectangular coordinates system (X',Y',Z') is about 205.068 mm.

In the second three-dimensional rectangular coordinates system (X',Y',Z'), a reflective surface of the first freeform surface 104a is an x'y' polynomial freeform surface. An x'y' polynomial surface equation can be expressed as follows:

$$z'(x', y') = \frac{c'(x'^2 + y'^2)}{1 + \sqrt{1 - (1+k')c'^2(x'^2 + y'^2)}} + \sum_{i=1}^{N} A_i' x'^m y'^n$$

In the x'y' polynomial freeform surface equation, z' represents surface sag, c' represents surface curvature, k' represents conic constant, while $A_i'$ represents the ith term coefficient. Since the freeform surface off-axial three-mirror imaging system 100 is symmetrical about Y'Z' plane, so even-order terms of x' can be only remained. At the same time, higher order terms will increase the fabrication difficulty of the freeform surface off-axial three-mirror imaging system 100. In one embodiment, the reflective surface of the first freeform surface 104a is a fourth-order polynomial freeform surface of x'y' without odd items of x'. An equation of the fourth-order polynomial freeform surface of x'y' can be expressed as follows:

$$z'(x', y') = \frac{c'(x'^2 + y'^2)}{1 + \sqrt{1 - (1+k')c'^2(x'^2 + y'^2)}} + A_2' y' + A_3' x'^2 + A_5' y'^2 + A_7' x'^2 y' + A_9' y'^3 + A_{10}' x'^4 + A_{12}' x'^2 y'^2 + A_{14}' y'^4 + A_{16}' x'^4 y' + A_{18}' x'^2 y'^3.$$

In one embodiment, the values of c', k', and $A_i'$ in the equation of the eighth-order polynomial freeform surface of x'y' are listed in TABLE 2. However, the values of c', k', and $A_i'$ in the equation of the eighth-order polynomial freeform surface of x'y' are not limited to TABLE 2.

TABLE 2

| | |
|---|---|
| c' | 2.9050135953E−03 |
| Conic Constant (k') | −2.0000000000E+01 |
| $A_2'$ | −4.1074509329E−01 |
| $A_3'$ | −2.0823946458E−03 |
| $A_5'$ | −2.6447846390E−03 |
| $A_7'$ | 2.7184263806E−05 |
| $A_9'$ | 1.2986485221E−05 |
| $A_{10}'$ | 4.1507879401E−08 |
| $A_{12}'$ | 8.4956081916E−08 |
| $A_{14}'$ | 2.5155613779E−08 |
| $A_{16}'$ | 9.3423798571E−10 |
| $A_{18}'$ | 1.7086690206E−09 |

A vertex of the second freeform surface 104b is an origin of the third three-dimensional rectangular coordinates system (X'',Y'',Z''). The third three-dimensional rectangular coordinates system (X'',Y'',Z'') is obtained by moving the second three-dimensional rectangular coordinates system (X',Y',Z') along an Z'-axis positive direction and a Y'-axis negative direction. In one embodiment, the third three-dimensional rectangular coordinates system (X'',Y'',Z'') is obtained by moving the second three-dimensional rectangular coordinates system (X',Y',Z') for about 2.863 mm along a Y'-axis negative direction, and then moving for about 12.739 mm along an Z'-axis negative direction, and then rotating along the counterclockwise direction for about 3.636° with the X' axis as the rotation axis. A distance between the origin of the second three-dimensional rectangular coordinates system (X',Y',Z') and the origin of the third three-dimensional rectangular coordinates system (X",Y",Z") is about 13.057 mm.

In the third three-dimensional rectangular coordinates system (X",Y",Z"), a reflective surface of the second freeform surface 104b is an x"y" polynomial freeform surface. An x"y" polynomial surface equation can be expressed as follows:

$$z''(x'', y'') = \frac{c''(x''^2 + y''^2)}{1 + \sqrt{1 - (1 + k'')c''^2(x''^2 + y''^2)}} + \sum_{i=1}^{N} A_i'' x''^m y''^n$$

In the x"y" polynomial freeform surface equation, z" represents surface sag, c" represents surface curvature, k" represents conic constant, while $A_i''$ represents the ith term coefficient. Since the freeform surface off-axial three-mirror imaging system 100 is symmetrical about Y"Z" plane, so even-order terms of x" can be only remained. At the same time, higher order terms will increase the fabrication difficulty of the freeform surface off-axial three-mirror imaging system 100. In one embodiment, the reflective surface of the second freeform surface 104b is a fourth-order polynomial freeform surface of x"y" without odd items of x". An equation of the fourth-order polynomial freeform surface of x"y" can be expressed as follows:

$$z''(x'', y'') = \frac{c''(x''^2 + y''^2)}{1 + \sqrt{1 - (1 + k'')c''^2(x''^2 + y''^2)}} + A_2'' y'' + A_3'' x''^2 + A_5'' y''^2 + A_7'' x''^2 y'' + A_9'' y''^3 + A_{10}'' x''^4 + A_{12}'' x''^2 y''^2 + A_{14}'' y''^4 + A_{16}'' x''^4 y'' + A_{18}'' x''^2 y''^3$$

In one embodiment, the values of c", k", and $A_i''$ in the equation of the eighth-order polynomial freeform surface of x"y" are listed in TABLE 3. However, the values of c", k", and A in the equation of the eighth-order polynomial freeform surface of x"y" are not limited to TABLE 3.

TABLE 3

| | |
|---|---|
| c" | −1.7198715496E−03 |
| Conic Constant (k") | −2.0000000000E+01 |
| $A_2''$ | −2.8476156510E−01 |
| $A_3''$ | −8.1816431466E−06 |
| $A_5''$ | −6.1295856898E−04 |
| $A_7''$ | 2.4682320767E−05 |
| $A_9''$ | 1.1543822730E−05 |
| $A_{10}''$ | −2.9325409902E−08 |
| $A_{12}''$ | −6.4494233230E−08 |
| $A_{14}''$ | −3.9424838348E−08 |
| $A_{16}''$ | 7.3676644654E−11 |
| $A_{18}''$ | −1.6543729895E−10 |

The aperture 108 includes a circular through hole with a radius of about 10.576 mm. In one embodiment, a central of the first field of view is 0°, and a range of the field of view is 2°×2°, the first EFL is 120 mm; a central of the second field of view is 4°, a range of the second field of view is 1.71°×1.71°, the second EFL is 140 mm. The aperture 108 is capable of moving between the center of the second three-dimensional coordinate system and the center of the third three-dimensional coordinate system.

A vertex of the tertiary mirror 110 is an origin of the fourth three-dimensional rectangular coordinates system (X'",Y'",Z'"). The fourth three-dimensional rectangular coordinates system (X'",Y'",Z'") is obtained by moving the first three-dimensional rectangular coordinates system (X,Y,Z) along an Z-axis negative direction and a Y-axis negative direction. In one embodiment, the fourth three-dimensional rectangular coordinates system (X'",Y'",Z'") is obtained by moving the first three-dimensional rectangular coordinates system (X,Y,Z) for about 123.525 mm along the Z-axis negative direction, and then moving for about 18.584 mm along the Y-axis negative direction, and then rotating along the counterclockwise direction for about 71.121° with the X-axis s as the rotation axis. A distance between the origin of the fourth three-dimensional rectangular coordinates system (X'",Y'",Z'") and the origin of the first three-dimensional rectangular coordinates system (X,Y,Z) is about 124.915 mm.

In the fourth three-dimensional rectangular coordinates system (X'",Y'",Z'"), a reflective surface of the tertiary mirror 110 is an x'"y'" polynomial freeform surface. An x'"y'" polynomial surface equation can be expressed as follows:

$$z'''(x''', y''') = \frac{c'''(x'''^2 + y'''^2)}{1 + \sqrt{1 - (1 + k''')c'''^2(x'''^2 + y'''^2)}} + \sum_{i=1}^{N} A_i''' x'''^m y'''^n.$$

In the x'"y'" polynomial freeform surface equation, z'" represents surface sag, c'" represents surface curvature, k'" represents conic constant, while $A_1'''$ represents the ith term coefficient. Since the freeform surface off-axial three-mirror imaging system 100 is symmetrical about Y'"Z'" plane, so even-order terms of x'" can be only remained. At the same time, higher order terms will increase the fabrication difficulty of the freeform surface off-axial three-mirror imaging system 100. In one embodiment, the reflective surface of the tertiary mirror 110 is a fourth-order polynomial freeform surface of x'"y'" without odd items of x'". An equation of the fourth-order polynomial freeform surface of x'"y'" can be expressed as follows:

$$z'''(x''', y''') = \frac{c'''(x'''^2 + y'''^2)}{1 + \sqrt{1 - (1 + k''')c'''^2(x'''^2 + y'''^2)}} + A_2''' y''' + A_3''' x'''^2 + A_5''' y'''^2 + A_7''' x'''^2 y''' + A_9''' y'''^3 + A_{10}''' x'''^4 + A_{12}''' x'''^2 y'''^2 + A_{14}''' y'''^4 + A_{16}''' x'''^4 y''' + A_{18}''' x'''^2 y'''^3.$$

In one embodiment, the values of c'", k'", and $A_i'''$ in the eighth order x'"y'" polynomial surface equation are listed in TABLE 4. However, the values of c'", k'", and $A_i'''$ in the fourth order x'"y'" polynomial surface equation are not limited to TABLE 4.

TABLE 4

| | |
|---|---|
| c'" | −4.7284759870E−03 |
| Conic Constant (k'") | −1.0000000076E+00 |
| $A_2'''$ | −4.1466998089E−02 |
| $A_3'''$ | 4.4881747268E−05 |
| $A_5'''$ | −2.0982402779E−04 |
| $A_7'''$ | 4.6762991642E−06 |
| $A_9'''$ | 1.4560243304E−06 |
| $A_{10}'''$ | −1.1651173535E−08 |
| $A_{12}'''$ | −2.1669621957E−08 |
| $A_{14}'''$ | −8.9614302576E−09 |
| $A_{16}'''$ | 1.2786423942E−10 |
| $A_{18}'''$ | 2.6054503418E−10 |

The materials of the primary mirror 102, the secondary mirror 104 and the tertiary mirror 110 can be aluminum, beryllium or other metals. The materials of the primary mirror 102, the secondary mirror 104 and the tertiary mirror 110 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film. A size of each of the primary mirror 102, the secondary mirror 104 and the tertiary mirror 110 can be designed according to actual needs.

In the fourth three-dimensional rectangular coordinates system (X''',Y''',Z'''), a distance along the Z'''-axis negative direction between a center of the detector 112 and the vertex of the tertiary mirror 110 is about 158.283 mm. The center of the detector 112 deviates from the Z''' axis in the positive direction of the Y''' axis, and a deviation is about 17.259 mm. An angle of the detector with the X'''Y''' plane in the clockwise direction is about 6.568°. A size of the detector 112 can be selected according to actual needs.

An effective entrance pupil diameter of a first field of view passage or a second field view of passage of the freeform surface off-axial three-mirror imaging system 100 is about 20 mm.

The freeform surface off-axial three-mirror imaging system 100 adopts an off-axis field of view in meridian direction. In one embodiment, a center of the first field of view is 0°, and a range of the first field of view is 2°×2°, wherein the range of the first field of view in the sagittal direction is −1° to 1°, the range of the first field of view in the meridional direction is −1° to 1°, the FOL is 120 mm. A center of the second field of view is 4°, and a range of the second field of view is 1.71°×1.71°, wherein the range of the second field of view in the sagittal direction is 3.145° to 4.855°, and the range of the second field of view in the meridional direction is −0.855° to 0.855°.

A wavelength of the freeform surface off-axial three-mirror imaging system 100 is not limited, in one embodiment, the wavelength of the freeform surface off-axial three-mirror imaging system 100 is from about 400 nm to about 700 nm.

Figure 2:
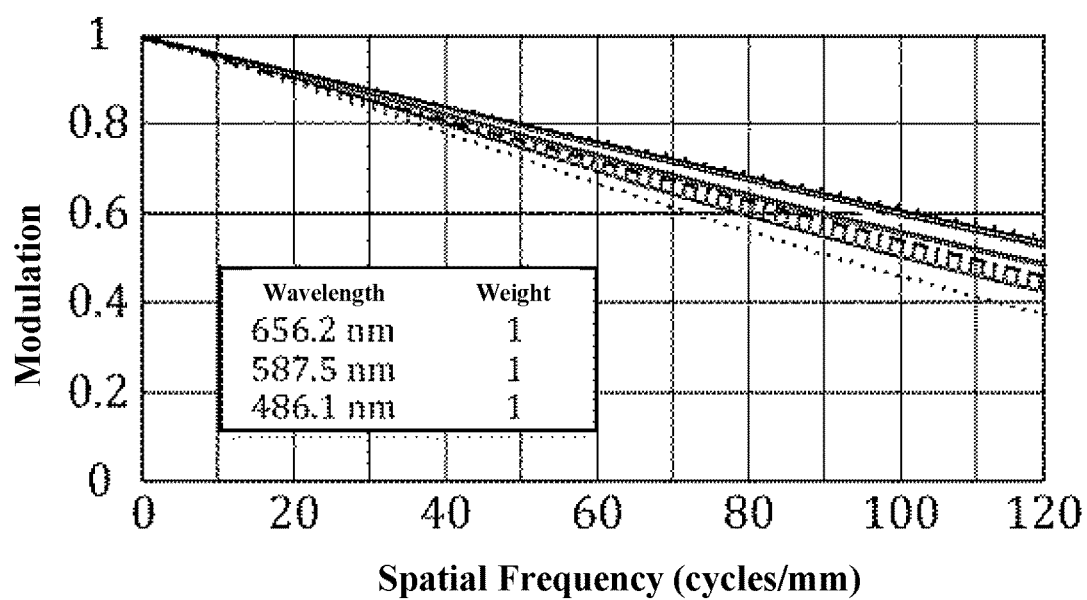
FIG. 2 shows a modulation-transfer-function (MTF) plot of an embodiment of a freeform surface off-axis three-mirror imaging system of one embodiment when an aperture is located on a first freeform surface.
Figure 3:
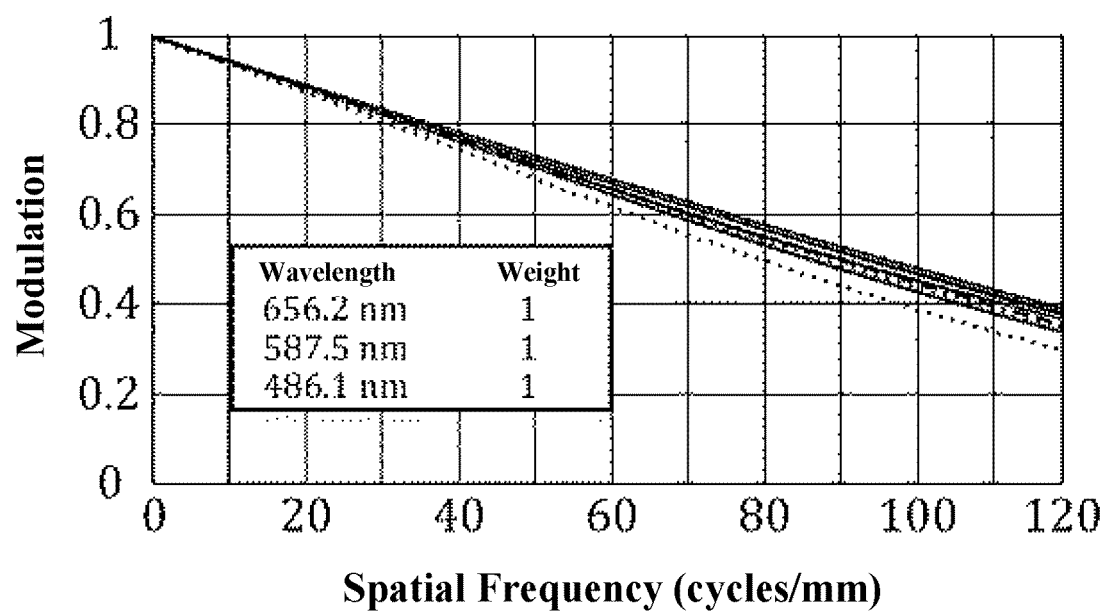
FIG. 3 shows a modulation-transfer-function (MTF) plot of a freeform surface off-axis three-mirror imaging system of one embodiment when an aperture is located on a second freeform surface.

A modulation transfer functions (MTF) of the freeform surface off-axial three-mirror imaging system 100 in visible band of different field of view is separately shown in FIGS. 2 and 3. In FIG. 2, the aperture 108 is located on the first freeform surface 104a, and the EFL is 120 mm. In FIG. 3, the aperture 108 is located on the second freeform surface 104b, and the EFL is 140 mm. FIGS. 2 and 3 both show that an imaging quality of the freeform surface off-axial three-mirror imaging system 100 is high.

Figure 4:
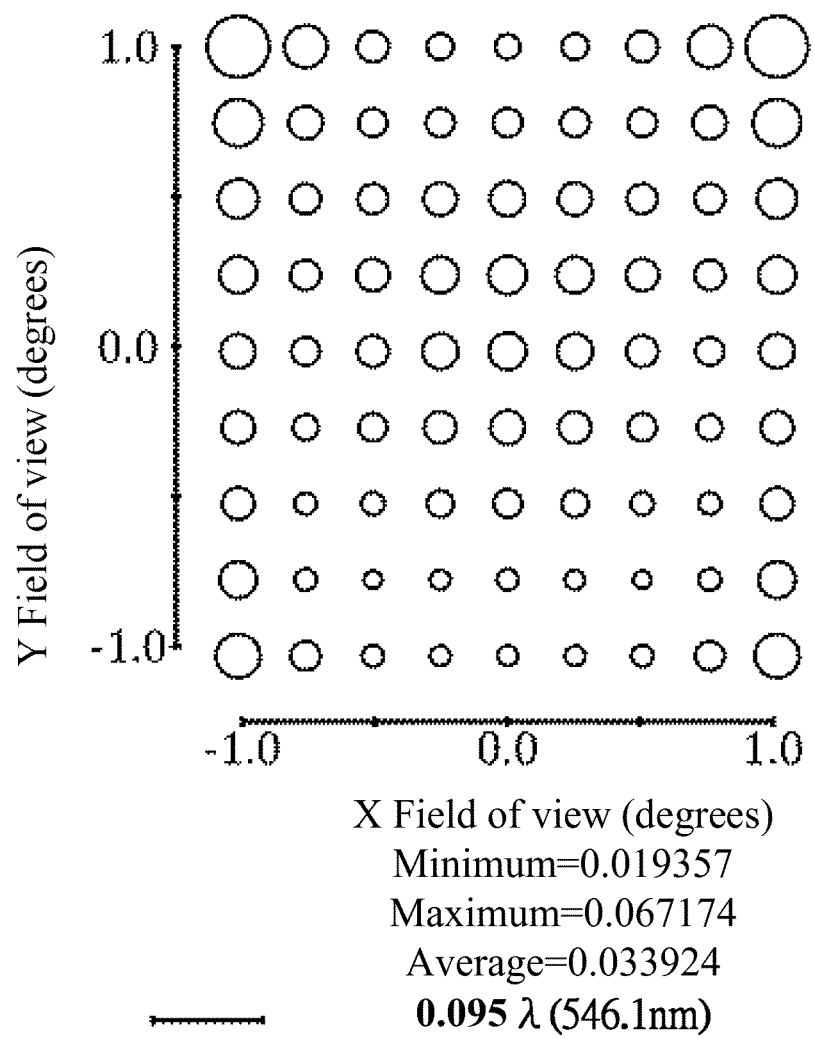
FIG. 4 shows a wave aberration diagram of an embodiment of a freeform surface off-axis three-mirror imaging system of one embodiment when an aperture is located on a first curve surface.
Figure 5:
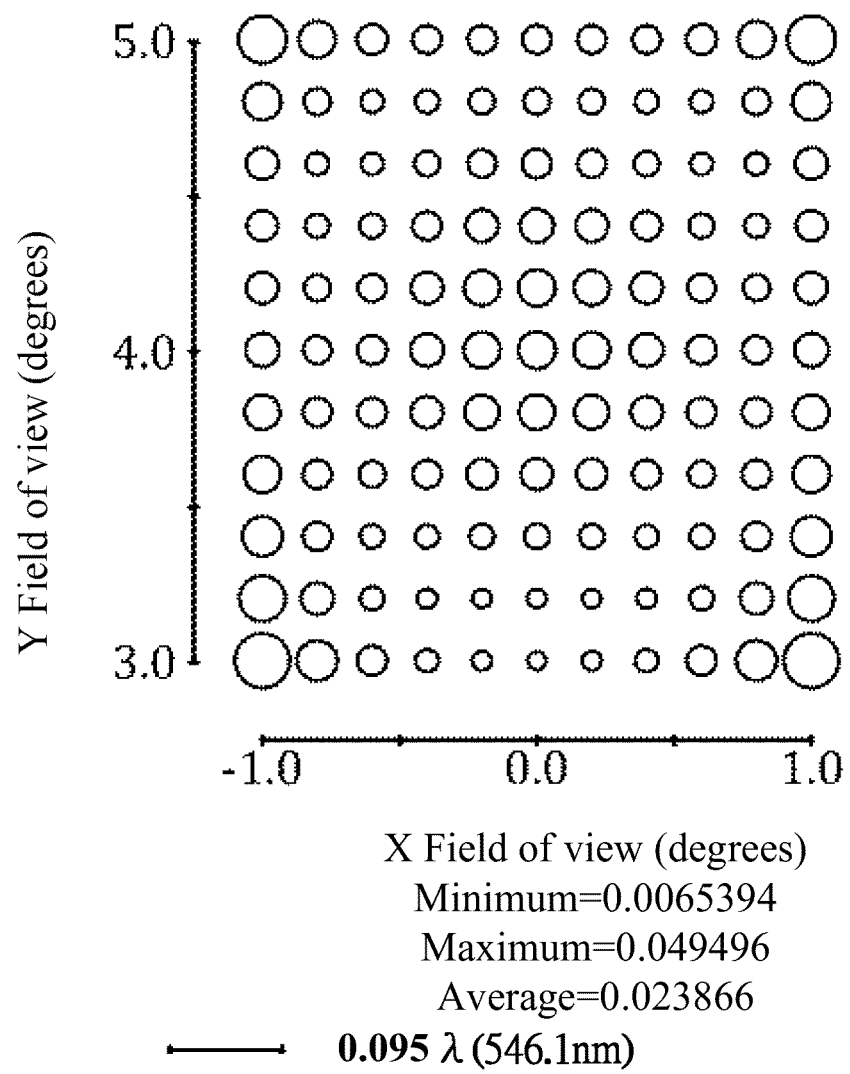
FIG. 5 shows a wave aberration diagram of an embodiment of a freeform surface off-axis three-mirror imaging system of one embodiment when an aperture is located on a second curve surface.

FIGS. 4 and 5 superlatively shows a wave aberration diagram of an embodiment of the freeform surface off-axis three-mirror imaging system 100. In FIG. 4, the aperture 108 is located on the first freeform surface 104a, and the EFL is 120 mm. In FIG. 5, the aperture 108 is located on the second freeform surface 104b, and the EFL is 140 mm. In the two different working states shown in FIGS. 4 and 5, the average value of the wave aberration is less than 0.034λ, where λ=546.1 nm. The imaging quality of the freeform surface off-axis three-mirror imaging system 100 is good.

The freeform off-axis three-mirror imaging system 100 provided by the present invention adopts an off-axis three-reverse system, and has no central obscuration. The freeform off-axis three-mirror imaging system 100 has two different fields of view, and objects of the two different fields of view are imaged at the same detector 112; The freeform off-axis three-mirror imaging system 100 has an F-number of 6, which enable the freeform off-axis three-mirror imaging system 100 has a high-resolution image. Further, the structure of the freeform off-axis three-mirror imaging system 100 is compact.

The applications of the freeform surface off-axial three-mirror imaging system 100 comprises earth observation, space target detection, astronomical observations, Multi-spectral thermal imaging, and dimensional mapping.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A freeform surface off-axial three-mirror imaging system, comprising:
    a primary mirror, a first three-dimensional rectangular coordinates system (X,Y,Z) is defined with a vertex of the primary mirror as a first origin, and in the first three-dimensional rectangular coordinates system (X,Y,Z), a reflective surface of the primary mirror is an xy polynomial freeform surface;
    a secondary mirror comprising a first freeform surface and a second freeform surface, a second three-dimensional rectangular coordinates system (X',Y',Z') is defined with a vertex of the first freeform surface as a second origin, and the second three-dimensional rectangular coordinates system (X',Y',Z') is obtained by moving the first three-dimensional rectangular coordinates system (X,Y,Z) along an Z-axis negative direction and a Y-axis positive direction, and in the second three-dimensional rectangular coordinates system (X',Y',Z'), a reflective surface of the first freeform surface is an x'y' polynomial freeform surface; a third three-dimensional rectangular coordinates system (X'',Y'',Z'') is defined with a vertex of the second freeform surface as a third origin, and the third three-dimensional rectangular coordinates system (X'',Y'',Z'') is obtained by moving the second three-dimensional rectangular coordinates system (X',Y',Z') along an Z-axis positive direction and a Y-axis negative direction, and in the third three-dimensional rectangular coordinates system (X'',Y'',Z''), a reflective surface of the second freeform surface is an x''y'' polynomial freeform surface;
    an aperture being capable of moving between the first freeform surface and the second freeform surface, wherein when the aperture is located on the first freeform surface, the freeform surface off-axial three-mirror imaging system comprises a first effective focal length; when the aperture is located on the second freeform surface, the freeform surface off-axial three-mirror imaging system comprises a second effective focal length different from the first effective focal length;
a tertiary mirror, a fourth three-dimensional rectangular coordinates system (X''',Y''',Z''') is defined with a vertex of the tertiary mirror as a fourth origin, and the fourth three-dimensional rectangular coordinates system (X''',Y''',Z''') is obtained by moving the first three-dimensional rectangular coordinates system (X,Y,Z) along an Z-axis negative direction and a Y-axis negative direction, and in the fourth three-dimensional rectangular coordinates system (X''',Y''',Z'''), a reflective surface of the tertiary mirror is an x'''y''' polynomial freeform surface;
a detector, feature rays is reflected by the primary mirror, the secondary mirror and the tertiary mirror to form an image on the detector;
wherein the freeform surface off-axial three-mirror imaging system comprises a first field of view formed by the first freeform surface and a second field of view formed by the second freeform surface.

2. The freeform surface off-axial three-mirror imaging system of claim 1, wherein the second three-dimensional rectangular coordinates system (X',Y',Z') is obtained by moving the first three-dimensional rectangular coordinates system (X,Y,Z) for approximately 154.876 mm along the Y-axis positive direction, and then moving for approximately 134.412 mm along the Z-axis negative direction, and then rotating along the counterclockwise direction for approximately 69.835° with the X axis as the rotation axis.

3. The freeform surface off-axial three-mirror imaging system of claim 1, wherein a distance between the origin of the first three-dimensional rectangular coordinates system (X,Y,Z) and the origin of the second three-dimensional rectangular coordinates system (X',Y',Z') is approximately 205.068 mm.

4. The freeform surface off-axial three-mirror imaging system of claim 1, wherein the third three-dimensional rectangular coordinates system (X'',Y'',Z'') is obtained by moving the second three-dimensional rectangular coordinates system (X',Y',Z') for approximately 2.863 mm along a Y'-axis negative direction, and then moving for approximately 12.739 mm along an Z'-axis negative direction, and then rotating along the counterclockwise direction for approximately 3.636° with the X' axis as the rotation axis.

5. The freeform surface off-axial three-mirror imaging system of claim 1, wherein a distance between the origin of the second three-dimensional rectangular coordinates system (X',Y',Z') and the origin of the third three-dimensional rectangular coordinates system (X'',Y'',Z'') is approximately 13.057 mm.

6. The freeform surface off-axial three-mirror imaging system of claim 1, wherein the fourth three-dimensional rectangular coordinates system (X''',Y''',Z''') is obtained by moving the first three-dimensional rectangular coordinates system (X,Y,Z) for approximately 123.525 mm along the Z-axis negative direction, and then moving for approximately 18.584 mm along the Y-axis negative direction, and then rotating along the counterclockwise direction for approximately 71.121° with the X-axis as the rotation axis.

7. The freeform surface off-axial three-mirror imaging system of claim 1, a distance between the origin of the fourth three-dimensional rectangular coordinates system (X''',Y''', Z''') and the origin of the first three-dimensional rectangular coordinates system (X,Y,Z) is approximately 124.915 mm.

8. The freeform surface off-axial three-mirror imaging system of claim 1, wherein the reflective surface of the primary mirror is a fourth-order polynomial freeform surface of xy without odd items of x; and an equation of the eighth-order polynomial freeform surface of xy can be expressed as follows:

$$z(x, y) = \frac{c(x^2 + y^2)}{1 + \sqrt{1 - (1 + k)c^2(x^2 + y^2)}} + A_2 y + A_3 x^2 + A_5 y^2 +$$
$$A_7 x^2 y + A_9 y^3 + A_{10} x^4 + A_{12} x^2 y^2 + A_{14} y^4 + A_{16} x^4 y + A_{18} x^2 y^3$$

wherein z represents surface sag, c represents surface curvature, k represents conic constant, and $A_i$ represents the ith term coefficient.

9. The freeform surface off-axial three-mirror imaging system of claim 8, wherein c=−5.8323994031E−04, k=−9.9850764719E−01, $A_2$=1.2842483202E+00, $A_3$=−2.2637598437E−04, $A_5$=−1.2187168002E−03, $A_7$=1.3798242519E−05, $A_9$=5.0401995782E−06, $A_{10}$=−6.8791876162E−09, $A_{12}$=−7.9586143947E−08, $A_{14}$=1.3200240494E−07, $A_{16}$=6.9303940947E−10, $A_{18}$=3.1467633702E−09.

10. The freeform surface off-axial three-mirror imaging system of claim 1, wherein in the second three-dimensional rectangular coordinates system (X',Y',Z'), the reflective surface of the secondary mirror is an fourth-order polynomial freeform surface of x'y' without odd items of x', and an equation of the eighth-order polynomial freeform surface of x'y' is:

$$z'(x', y') = \frac{c'(x'^2 + y'^2)}{1 + \sqrt{1 - (1 + k')c'^2(x'^2 + y'^2)}} + A'_2 y' + A'_3 x'^2 + A'_5 y'^2 +$$
$$A'_7 x'^2 y' + A'_9 y'^3 + A'_{10} x'^4 + A'_{12} x'^2 y'^2 + A'_{14} y'^4 + A'_{16} x'^4 y' + A'_{18} x'^2 y'^3,$$

wherein z' represents surface sag, c' represents surface curvature, k' represents conic constant, and $A'_i$ represents the ith term coefficient.

11. The freeform surface off-axial three-mirror imaging system of claim 10, wherein c'=2.9050135953E−03, k'=−2.0000000000E+01, $A_2'$=−4.1074509329E−01, $A_3'$=−2.0823946458E−03, $A_5'$=−2.6447846390E−03, $A_7'$=2.7184263806E−05, $A_9'$=1.2986485221E−05, $A_{10}'$=4.1507879401E−08, $A_{12}'$=8.4956081916E−08, $A_{14}'$=2.5155613779E−08, $A_{16}'$=9.3423798571E−10, $A_{18}'$=1.7086690206E−09.

12. The freeform surface off-axial three-mirror imaging system of claim 1, wherein in the third three-dimensional rectangular coordinates system (X'',Y'',Z''), the reflective surface of the tertiary mirror is an fourth-order polynomial freeform surface of x''y'' without odd items of x'', and an equation of the eighth-order polynomial freeform surface of x''y'' is $$z''(x'', y'') =$$
$$\frac{c''(x''^2 + y''^2)}{1 + \sqrt{1 - (1 + k'')c''^2(x''^2 + y''^2)}} + A''_2 y'' + A''_3 x''^2 + A''_5 y''^2 + A''_7 x''^2 y'' +$$
$$A''_9 y''^3 + A''_{10} x''^4 + A''_{12} x''^2 y''^2 + A''_{14} y''^4 + A''_{16} x''^4 y'' + A''_{18} x''^2 y''^3$$

wherein z'' represents surface sag, c'' represents surface curvature, k'' represents conic constant, and $A_i''$ represents the ith term coefficient.

13. The freeform surface off-axial three-mirror imaging system of claim 12, wherein $c''=-1.7198715496E-03$, $k''=-2.0000000000E+01$, $A_2''=-2.8476156510E-01$, $A_3''=-8.1816431466E-06$, $A_5''=-6.1295856898E-04$, $A_7''=2.4682320767E-05$, $A_9''=1.1543822730E-05$, $A_{10}''=-2.9325409902E-08$, $A_{12}''=-6.4494233230E-08$, $A_{14}''=-3.9424838348E-08$, $A_{16}''=7.3676644654E-11$, $A_{18}''=-1.6543729895E-10$.

14. The freeform surface off-axial three-mirror imaging system of claim 1, wherein in the fourth three-dimensional rectangular coordinates system (X''',Y''',Z'''), a distance along the Z'''-axis negative direction between a center of the detector and the vertex of the tertiary mirror is approximately 124.915 mm.

15. The freeform surface off-axial three-mirror imaging system of claim 1, wherein an effective the freeform surface off-axial three-mirror imaging system is approximately 20 mm.

16. The freeform surface off-axial three-mirror imaging system of claim 1, wherein a center of the first field of view is 0°, and a range of the first field of view is 2°×2°.

17. The freeform surface off-axial three-mirror imaging system of claim 1, wherein the first effective focal length is 120 mm.

18. The freeform surface off-axial three-mirror imaging system of claim 1, wherein a center of the second field of view is 4°, and a range of the second field of view is 2°×2°.

19. The freeform surface off-axial three-mirror imaging system of claim 18, wherein the range of the second field of view in the sagittal direction is 3° to 5°, and the range of the second field of view in the meridional direction is −1° to 1°.

20. The freeform surface off-axial three-mirror imaging system of claim 1, wherein the second effective focal length is 140 mm.

* * * * *